United States Patent
Lee et al.

(10) Patent No.: US 8,109,424 B2
(45) Date of Patent: Feb. 7, 2012

(54) TRAY APPARATUS

(75) Inventors: Jong Sun Lee, Hwaseong-si (KR); Yang Gi Lee, Suwon-si (KR); Tae Hoon Song, Suwon-si (KR); In Gyu Kim, Hwaseong-si (KR); Jin Wan Park, Suwon-si (KR); Yong Gu Kang, Cheonan-si (KR)

(73) Assignees: Hyundai Motor Company, Seoul (KR); Duckyang Ind. Co. Ltd., Ulsan-Si (KR)

( * ) Notice: Subject to any disclaimer, the term of this patent is extended or adjusted under 35 U.S.C. 154(b) by 580 days.

(21) Appl. No.: 12/325,130

(22) Filed: Nov. 28, 2008

(65) Prior Publication Data
US 2009/0289092 A1 Nov. 26, 2009

(30) Foreign Application Priority Data
May 22, 2008 (KR) .................. 10-2008-0047438

(51) Int. Cl.
*B60R 7/06* (2006.01)
(52) U.S. Cl. ................ 224/483; 224/281
(58) Field of Classification Search .......... 296/26.09, 296/37.12; 108/44; 224/281, 483
See application file for complete search history.

(56) References Cited

U.S. PATENT DOCUMENTS

| | | | | |
|---|---|---|---|---|
| 3,785,300 A * | 1/1974 | Anderson | | 108/44 |
| 4,194,104 A * | 3/1980 | Stenta | | 200/526 |
| 4,660,881 A * | 4/1987 | Komeya et al. | | 296/37.9 |
| 4,925,072 A * | 5/1990 | Masler et al. | | 224/282 |
| 5,460,309 A * | 10/1995 | Nehl et al. | | 224/281 |
| 5,680,974 A * | 10/1997 | Vander Sluis | | 224/281 |
| 5,775,761 A * | 7/1998 | Asami et al. | | 296/37.7 |
| 6,065,729 A * | 5/2000 | Anderson | | 248/311.2 |
| 6,799,705 B1 * | 10/2004 | Lutoslawski | | 224/483 |
| 6,808,214 B2 * | 10/2004 | Sato et al. | | 292/341.15 |
| 2006/0027617 A1 * | 2/2006 | Kogami et al. | | 224/483 |

FOREIGN PATENT DOCUMENTS

| | | |
|---|---|---|
| KR | 10-0567127 B1 | 3/2006 |
| KR | 10-0643602 B1 | 11/2006 |
| KR | 10-2008-0035221 A | 4/2008 |

* cited by examiner

*Primary Examiner* — Brian D Nash
(74) *Attorney, Agent, or Firm* — Morgan, Lewis & Bockius LLP

(57) ABSTRACT

A tray apparatus may include a housing, a tray slidably accommodated in the housing to be opened or closed, a rotary lock pivotally coupled to the housing at a hinge portion of the rotary lock and locking the tray to the housing when external shock is applied to the tray beyond a predetermined value, wherein a center of gravity of the rotary lock is positioned above the hinge portion, and a holding unit for holding the rotary lock in a normal state so that the rotary lock maintains an original position thereof.

15 Claims, 11 Drawing Sheets

TRAY APPARATUS

CROSS-REFERENCE TO RELATED APPLICATION

The present application claims priority to Korean Patent Application Number 10-2008-0047438 filed May 22, 2008, the entire contents of which application is incorporated herein for all purposes by this reference.

BACKGROUND OF THE INVENTION

1. Field of the Invention

The present invention relates to a tray apparatus, which prevents a tray, installed in a vehicle to hold articles, from unexpectedly opening due to external shocks.

2. Description of Related Art

In vehicle safety standards or regulations, there is a regulation pertaining to interior compartment doors and stating that trays installed in a vehicle must not open in a dummy crash test under given conditions, in order to ensure the safety of occupants.

For example, referring to FIG. 1, showing a rotary tray apparatus, when the head of a dummy collides with a center fascia panel 1, a tray 2 mounted to the panel 1 must not open. To this end, a car maker mounts a variety of devices for preventing the tray from opening, to the tray 2 and/or a tray housing 3 so as to prevent the tray 2 from unexpectedly opening due to external shocks. However, the effectiveness of the devices does not meet users' expectations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a tray apparatus, which is constructed so that a tray is not unexpectedly opened by external shocks and/or inertia force, to provide a tray apparatus, which has superior performance for preventing a tray from unexpectedly opening, and to provide a tray apparatus, which enables high freedom of design.

In an aspect of the present invention, a tray apparatus may include a housing, a tray slidably accommodated in the housing to be opened or closed, a rotary lock pivotally coupled to the housing at a hinge portion of the rotary lock and locking the tray to the housing when external shock is applied to the tray beyond a predetermined value, wherein a center of gravity of the rotary lock is positioned above the hinge portion, and/or a holding unit for holding the rotary lock in a normal state so that the rotary lock maintains an original position thereof.

A weight may be disposed at upper portion of the rotary lock with a predetermined distance from the hinge portion. The predetermined distance may be adjustable along the rotary lock so as to control a response time of the rotary lock.

The rotary lock may be pivotally coupled to the housing behind the tray so that the rotary lock returns to the original position as a user presses the try toward the housing.

The holding unit may include an elastic member supplying elastic force to the rotary lock sufficiently enough to hold the rotary lock in the original position in the normal state.

The elastic member may be a torsion spring disposed at the hinge portion of the rotary lock.

In another aspect of the present invention, the tray apparatus may further include first elastic piece formed at a slot installed at upper surface of the housing, upper end of the rotary lock passing through the slot that guides the upper end of the rotary lock in a forward or rearward direction, wherein first end of the slot is disposed substantially at the same position as the original position of the rotary lock and second end thereof is spaced from the first end of the slot in the forward direction from the original position of the rotary lock with a predetermined distance. The first elastic piece may protrude from the upper surface of the housing toward the slot at the second end of the slot so that the upper end of the rotary lock is held between the upper surface and the first elastic piece when the upper end of the rotary lock rotates toward the first elastic piece after the external shock is applied beyond the predetermined value.

In another aspect of the present invention, the tray apparatus may further include a pressing member disposed substantially at the original position of the rotary lock and slidably coupled to the upper surface of the housing in a perpendicular direction to longitudinal direction of the slot and slidably movable toward the slot, and/or an elastic member biasing the pressing member toward the slot, wherein the upper end of the rotary lock is held by the pressing member in the normal state.

A locking hole may be formed in the upper end of the rotary lock, and a locking protrusion is provided on a front end of the pressing member to correspond to the locking hole.

A second elastic piece may be formed at the first end of the slot, wherein the first end of the slot extends in the rearward direction from the original position of the rotary lock with a predetermined distance and the second elastic piece protrudes from the upper surface toward the slot so that the upper end of the rotary lock is held between the upper surface and the second elastic piece when the upper end of the rotary lock rotates toward the second elastic piece after the external shock is applied beyond the predetermined value.

In further another aspect of the present invention, the tray apparatus may include a damping unit coupled to rotary lock to reduce rotation speed of the rotary lock when the external shock is applied to the rotary lock. The damping unit may include a gear portion provided on a lower end of the rotary lock, wherein the hinge portion of the rotary lock is spaced from bottom surface of the housing with a predetermined distance, a toothed wheel rotatably mounted to the bottom surface of the housing, and engaging with the gear portion, thus limiting rotation angle of the rotary lock, and/or a damper coupled to the toothed wheel, limiting the rotation speed of the rotary lock.

In another aspect of the present invention, the tray apparatus may further include a hook attached to the rotary lock, the hook extending in the forward direction and bent perpendicularly at a front end thereof, wherein longitudinal axis of the hook is substantially perpendicular to longitudinal axis of the rotary lock, and/or a locking member provided at the tray, the locking member having a sliding hole, wherein the hook is locked to the locking member when the hook rotates along with the rotary lock with respect to the hinge portion of the rotary lock in tracing a predetermined radius and the hook is aligned to the sliding hole of the locking member when the hook is stationary. A rotary lock mounting space may be provided in a rear portion of the tray, and the locking member is provided on a tray wall in the rotary lock mounting space, and the sliding hole is formed in the tray wall so as to prevent the locking member from interfering with the hook when the rotary lock maintains the original state.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A tray apparatus according to various embodiments of the present invention will be described with reference to FIGS. 2A to 7.

Figure 1:
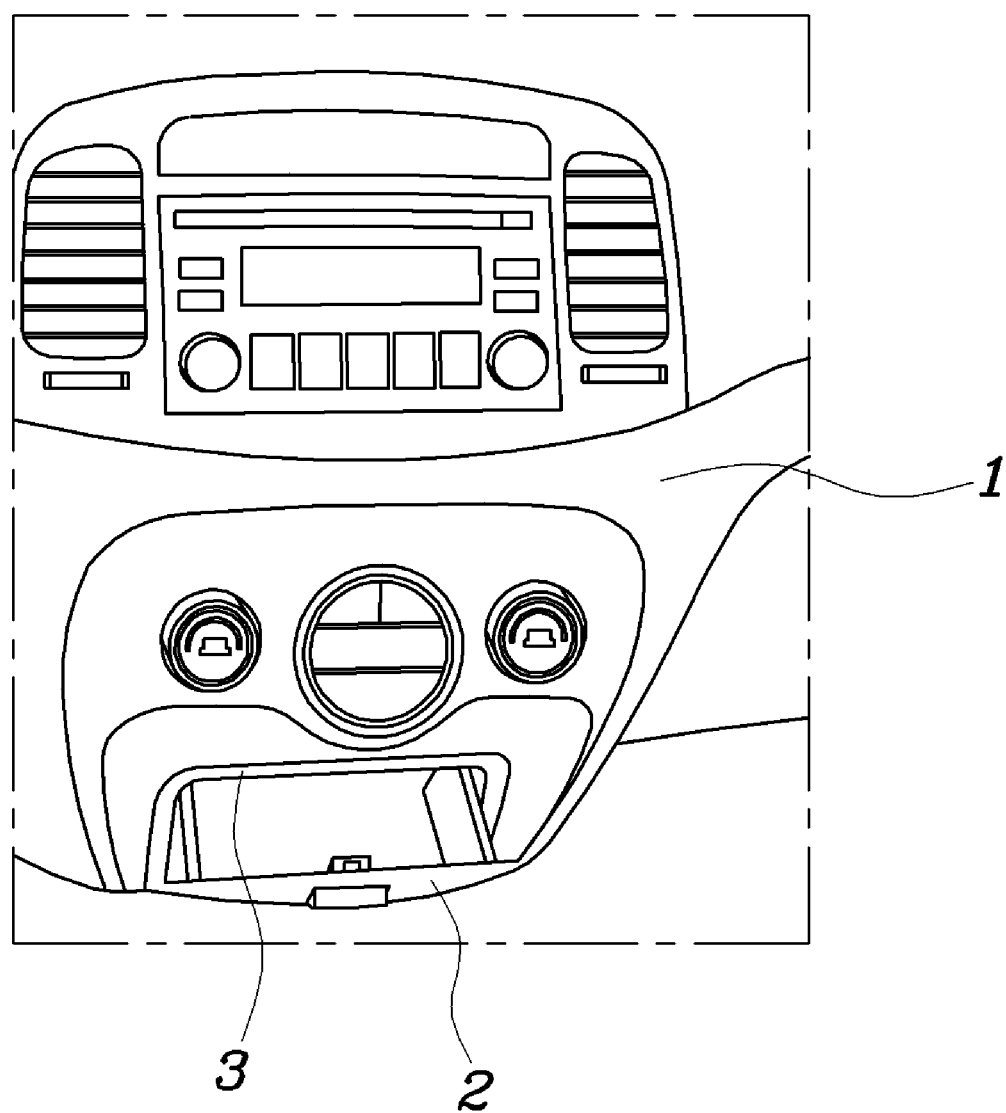
FIG. 1 is a view showing a conventional tray apparatus.
Figure 2A:
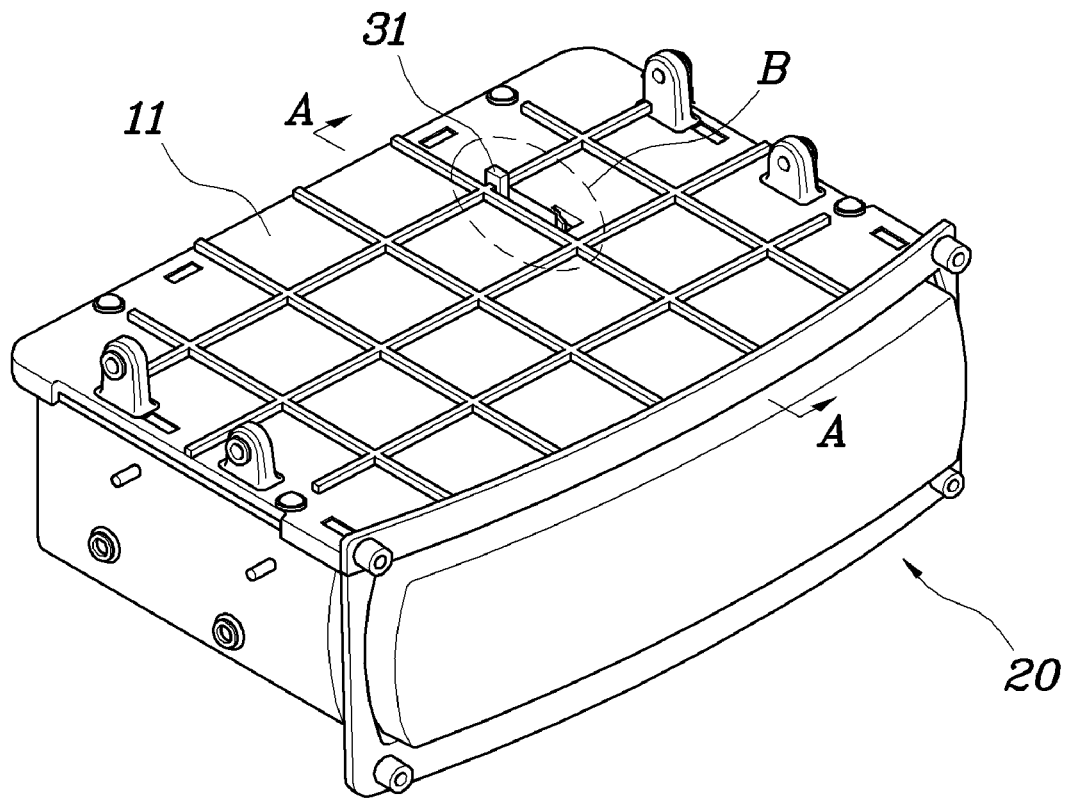
FIG. 2A is a view showing an exemplary tray apparatus according to the present invention.
Figure 2B:
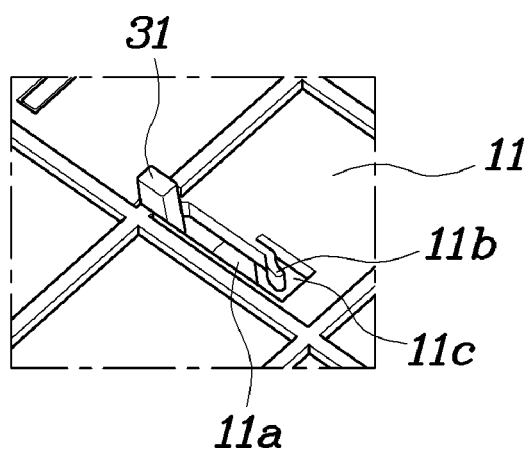
FIG. 2B is an enlarged view of the portion indicated by B in FIG. 2A.
Figure 3:
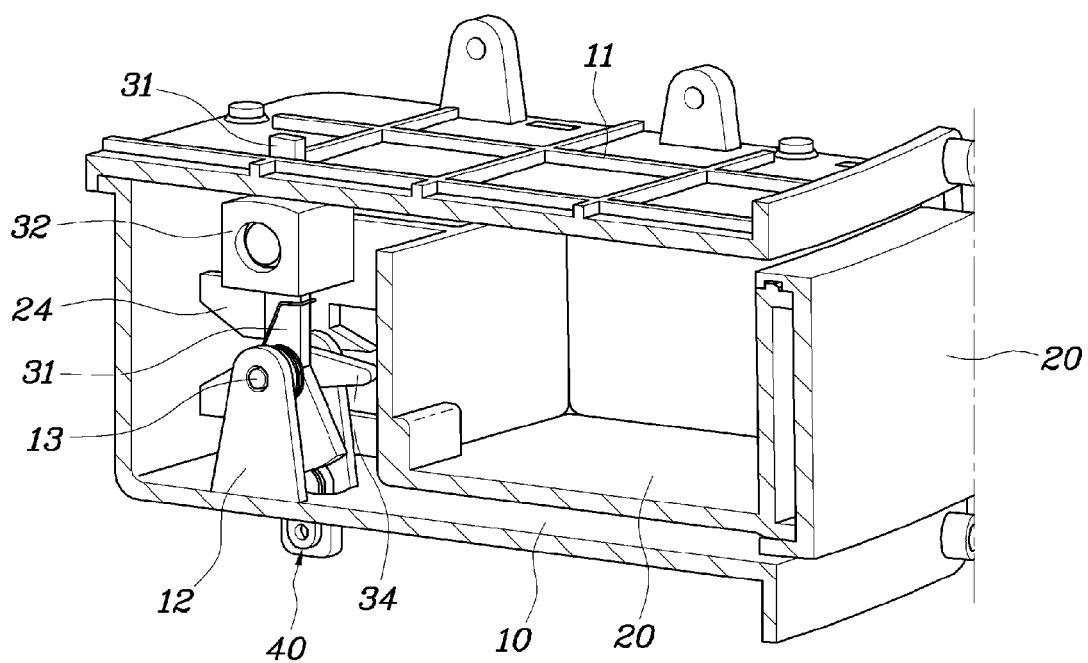
FIG. 3 is a sectional view taken along line A-A of FIG. 2A.

Referring to FIGS. 2A to 3, the tray apparatus includes a housing 10 which is open at the front, and a tray 20 which is accommodated in the housing 10 to be opened and closed. When the front of the closed tray 20 is slightly pressed, the tray 20 is slightly pushed backwards and thereafter opens.

Meanwhile, a slot 11a is provided in the upper surface 11 of the housing 10, and the upper end of a rod 31 of a rotary lock protrudes upwards from the upper surface 11 through the slot 11a. The upper end of the rod 31 is located at the rear end in the slot 11a.

An elastic piece 11b is provided at the front end in the slot 11a, and has a free end due to an extension hole 11c, thus applying elastic force to the upper end of the rod perpendicularly relative to the slot 11a.

Figure 5:
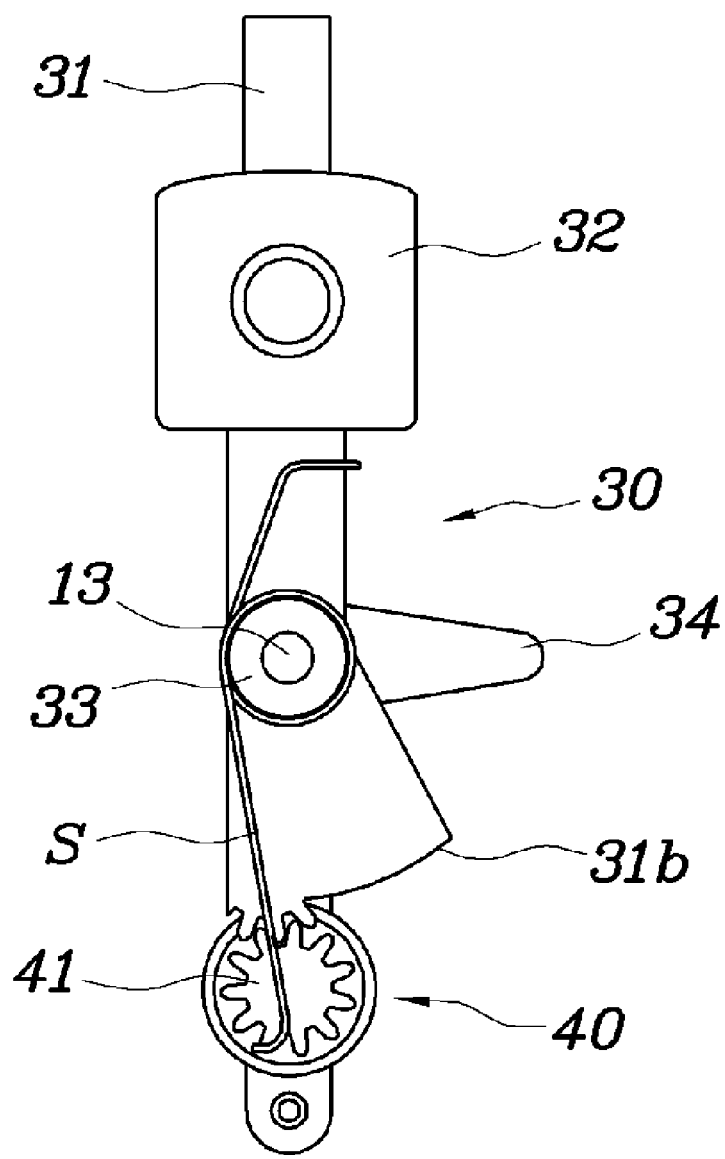
FIG. 5 is a view showing a rotary lock and a holding unit of FIG. 4.

As shown in FIGS. 3 and 5, a rotary lock 30 is installed in a space defined between the housing 10 and the tray 20. The rotary lock 30 is secured via a hinge pin 13 between a pair of support ribs 12, which are mounted to the bottom of the housing 10, so that the rotary lock 30 may be rotated forwards and backwards around a hinge portion 13 (when the rotary lock rotates forwards, the tray opens). A damper 40 is provided under the rotary lock 30 in such a way as to be mounted to the bottom of the housing 10, and serves as a holding unit for holding the rotary lock 30 so that the rotary lock 30 can be erected (the first position before the rotary lock 30 rotates).

Figure 4:
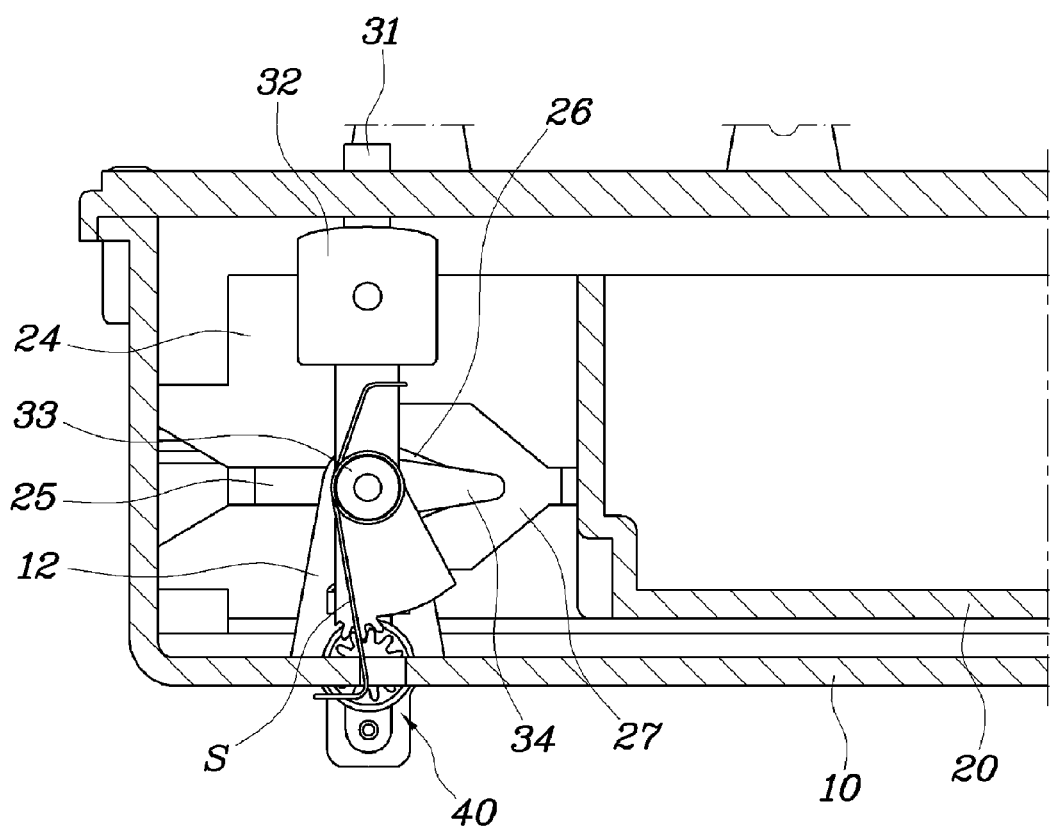
FIG. 4 is a sectional view of the tray apparatus when viewing the tray apparatus from an angle different from that of FIG. 3.

The rotary lock 30 will be described with reference to FIGS. 3 to 5. The rotary lock 30 includes a rod 31 which is secured to the housing 10 via the hinge pin, a weight 32, and a hook 34.

As described above, the upper end of the rod 31 passes through the slot 11a to be exposed outside. The slot 11a guides the upper end of the rod 31 which rotates around the hinge portion 13. First, the upper end of the rod 31 is located at the rear end in the slot 11a (see FIG. 2B). While the rotary lock 30 is rotated, the upper end of the rod 31 moves forwards along the slot 11a and is compressed by the elastic piece 11b which is provided at the front end in the slot 11a, so that the upper end of the rod 31 is held in the front end of the slot 11a.

The weight 32 is installed at the upper end of the rod 31. The center of gravity of the rotary lock 30 is located above the hinge portion 13 by the weight 32. When shocks are applied to the front or back of the tray apparatus, the weight 32 causes the upper end of the rotary lock 30 to be rotated in a tray opening direction (clockwise) prior to the tray 20, and locks the tray 20. The locking structure will be described below.

In various embodiments of the present invention, the weight 32 is adjustable along the rod 31 so that the response time of the rotary lock can be controlled.

The hinge pin (i.e. hinge portion 13) passes through a hinge support part 33 of the rod 31, with a torsion spring S wound around the hinge support part 33. The upper end of the torsion spring S is secured to the rod 31, while the lower end of the torsion spring S is secured to the bottom of the housing 10, so that the torsion spring S provides elastic force for rotating the rotary lock 30 counterclockwise.

Figure 6:
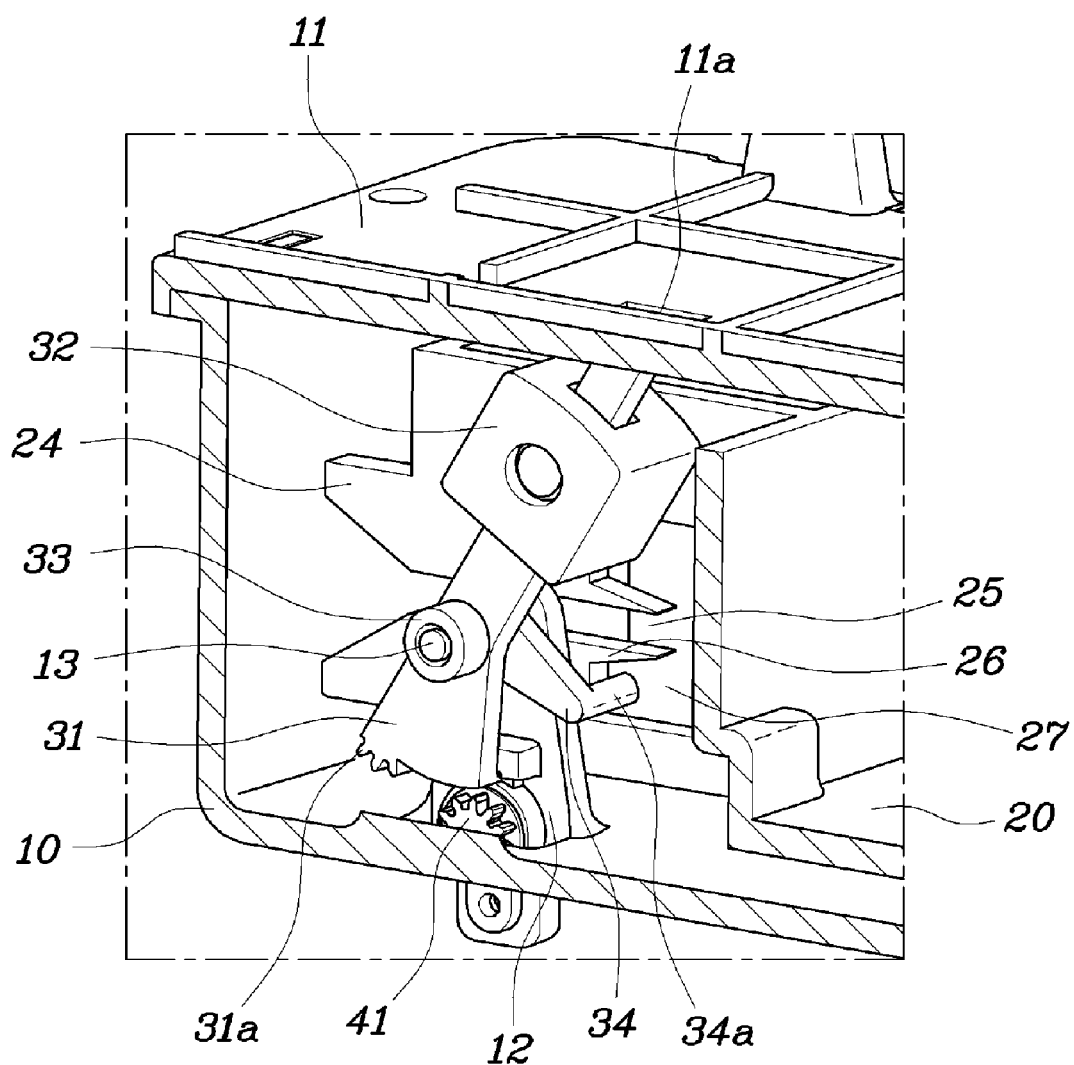
FIG. 6 is a view showing the state in which the rotary lock of the tray apparatus of FIG. 3 is rotated clockwise so as to lock the tray.

The rotary lock holding unit will be described with reference to FIGS. 4-6. The rotary lock holding unit holds the rotary lock 30 such that it maintains its original erected state, and, in addition, rotates the rotary lock 30 around the hinge portion 13 when external force exceeding a predetermined level acts on the rotary lock 30. The holding unit comprises a combination of a gear portion 31a provided on the lower end of the rod 31 and the damper 40 mounted to the underside of the housing 10.

The gear portion 31a is provided on the lower end of the rod 31 having the shape of a fan, the lower portion of which is wider than the upper portion thereof. A toothed wheel 41 is provided on the damper 40 to engage with the gear portion 31a. The damper 40 is an oil damper, and the rotation of the toothed wheel 41 is limited within a predetermined range by the viscosity of oil. Thus, the movement of the rotary lock 30, whose gear portion 31a engages with the toothed wheel 41 of the damper 40, is limited within a predetermined range. Meanwhile, the gear portion 31a is provided on part of the lower end of the rod 31, that is, the rear side of the rod 31, and a non-gear portion 31b is provided on the front side of the rod 31. When the rotary lock 30 is vertically erected (first position), the toothed wheel 41 of the damper 40 engage with the gear portion 31*a*. However, once force (rotating force acting in a clockwise direction) exceeding a predetermined level acts on the rotary lock 30, the rotary lock 30 responds faster than the tray 20, thus locking the tray 20.

The structure for locking the tray 20 using the rotary lock 30 will be described with reference to FIGS. 4 to 7.

A hook 34 is provided on the rod 31. The hook 34 extends from a position around the hinge portion 13 in a tray opening direction, that is, extends forwards, and then is bent perpendicularly at the front end thereof. Further, a locking member 26 is provided on the tray 20, and engages with a hook 34 which rotates along with the rotary lock 30 while tracing a predetermined radius when the rotary lock 30 is rotated. The locking member 26 is provided on a tray wall 24 in a space 23 in which the rotary lock 30 is installed in the rear portion of the tray 20. A sliding hole 25 is formed in the tray wall 24 in a horizontal direction thereof, and prevents the locking member 26 from interfering with the hook 34 when the rotary lock 30 is maintained at the first position.

Figure 7:
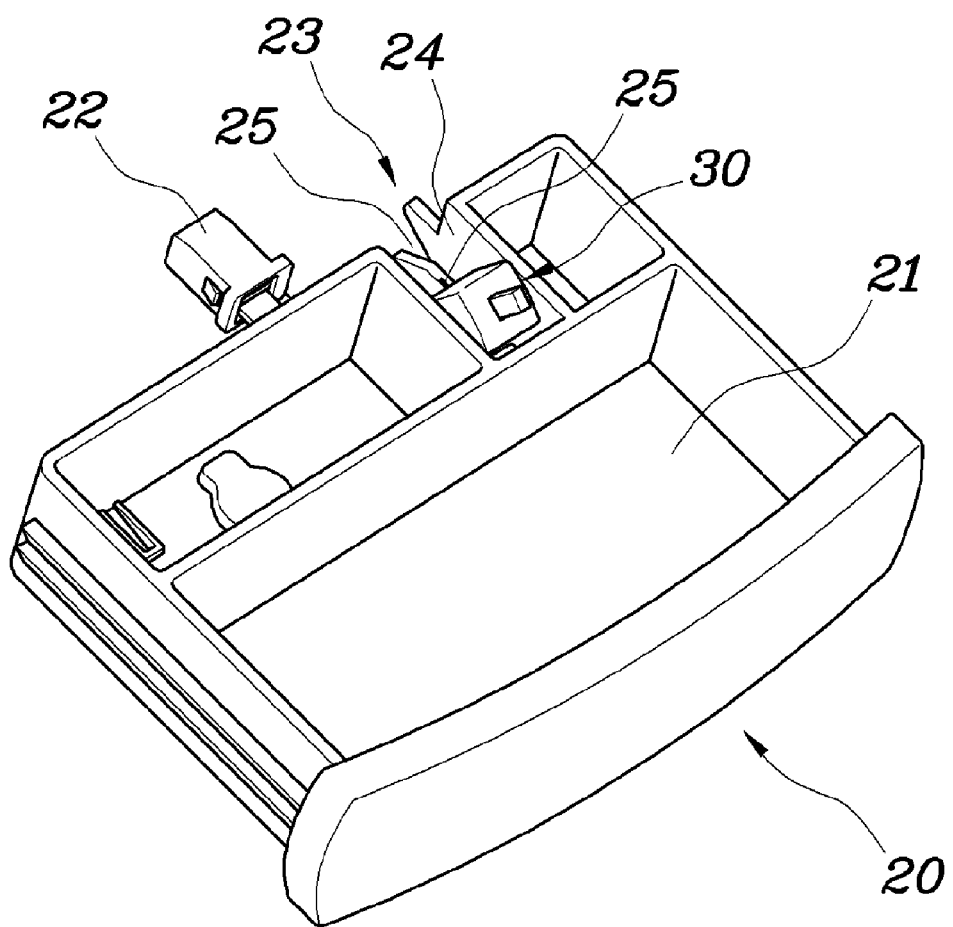
FIG. 7 is a view showing the tray and the rotary lock which are separated from the tray apparatus of FIG. 6.

Before the rotary lock 30 is rotated, a bent portion 34*a* of the hook 34 is located at a front position in the sliding hole 25. When shocks are applied to the front or back of the tray apparatus, the upper end of the rotary lock 30 is rotated in the clockwise direction in the tray opening direction before the tray 20 slides forwards, so that the bent portion 34*a* of the hook 34 is locked to the locking member 26 (see FIG. 6). The bent portion 34*a* is coupled to the locking member 26 through the opening 27. Furthermore, the upper end of the rod 31 may be locked to the elastic piece 11*b*. Meanwhile, the tray 20 may be released from the hook 34 and/or the elastic piece 11*b* merely by pressing the front of the tray 20 backwards so that the upper portion of the rod 31 and the weight 32 moves backwards by rear wall of the tray 20. That is, when the front of the tray 20 is pressed backwards such that the locking member 26 can be released from the hook 34, the rotary lock 30 is slowly rotated counterclockwise by the elastic force of the torsion spring S, so that the tray 20 returns to its original position. In FIG. 7, reference numeral 21 denotes a holding space of the tray 20, and reference numeral 22 denotes a push-lock type latch.

Next, a tray apparatus according to other various embodiments will be described with reference to FIGS. 8 to 13. These embodiments are similar to those described above except for a rotary lock holding unit. Thus, elements common to both embodiments will carry the same reference numeral, excluding the holding unit. The duplicate description of elements common to both embodiments will be omitted herein.

Figure 8:
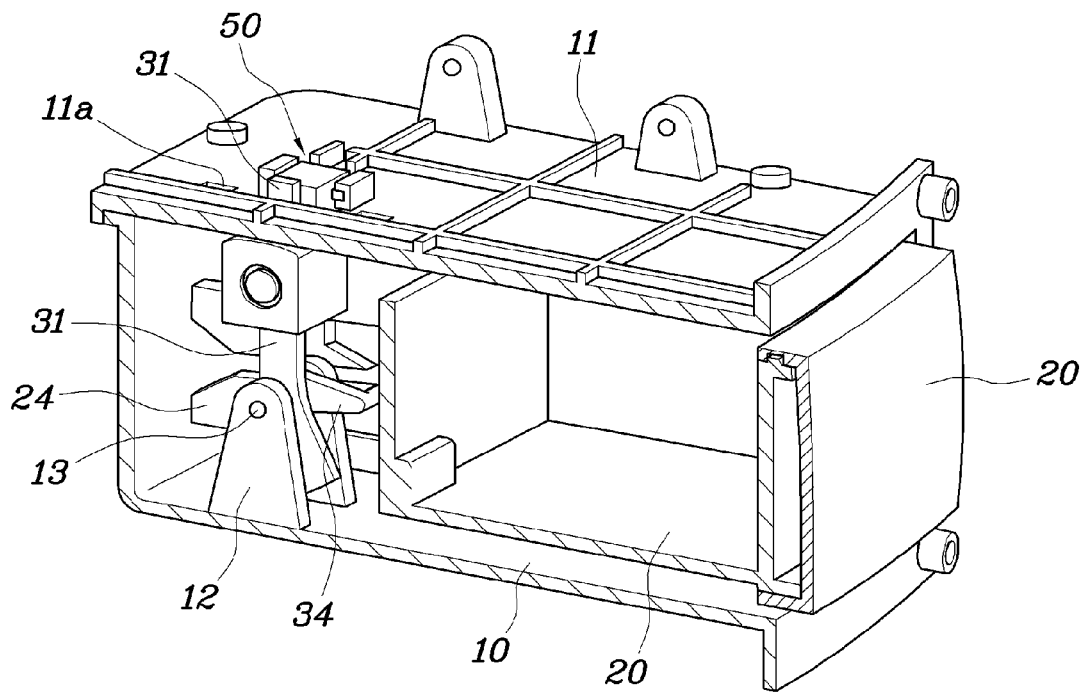
FIG. 8 is a view showing an exemplary tray apparatus according to the present invention.
Figure 9:
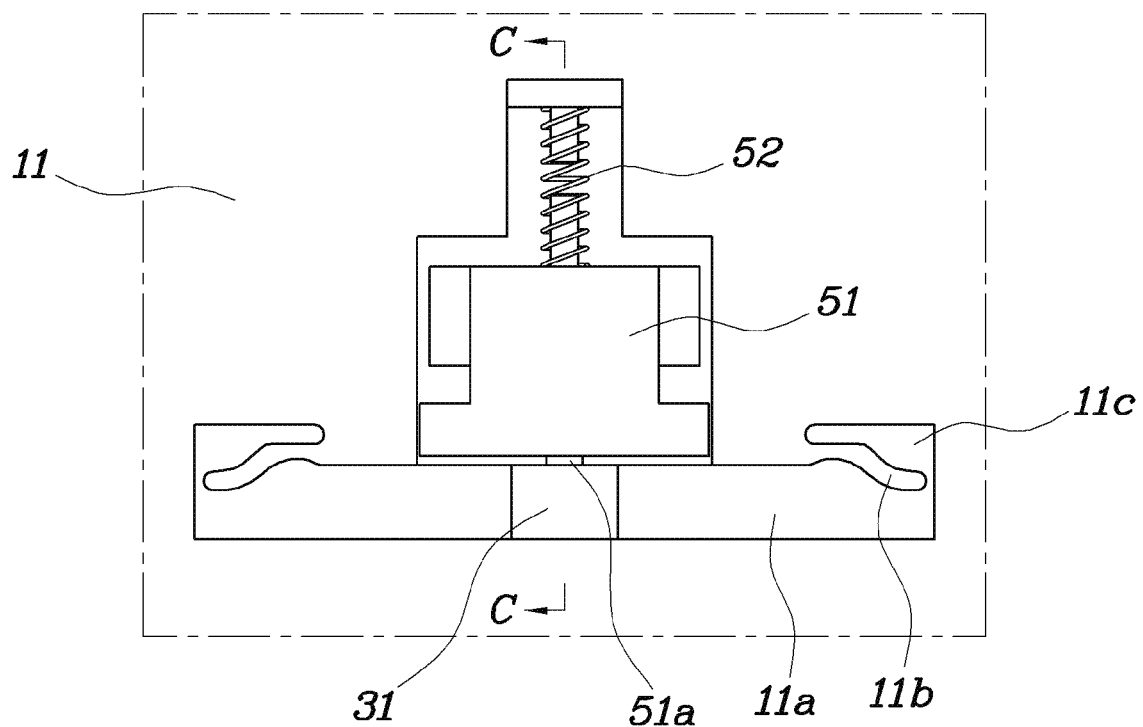
FIG. 9 is a view showing the upper surface of a housing (portion on which a holding unit is provided) of the tray apparatus shown in FIG. 8.
Figure 10:
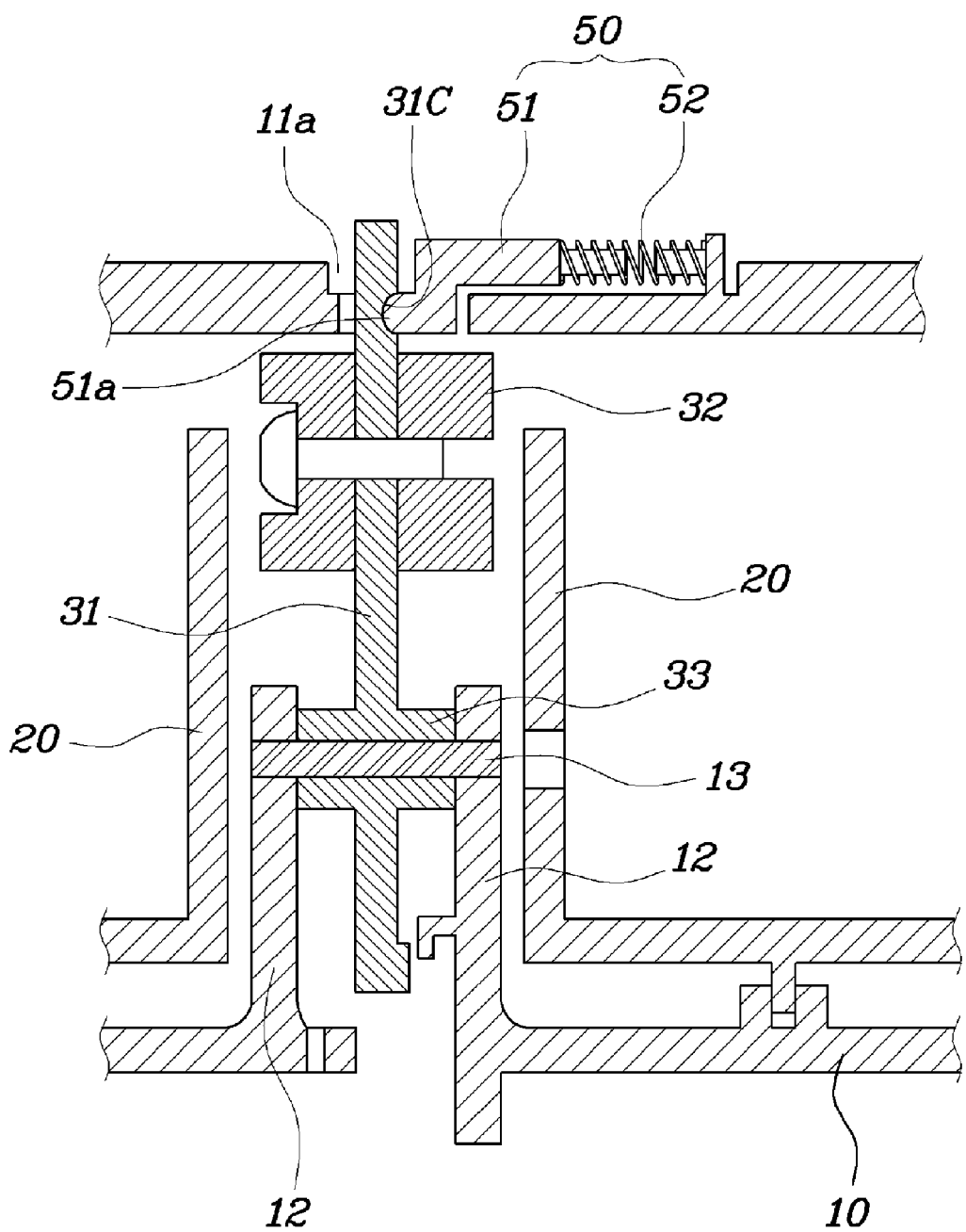
FIG. 10 is a sectional view taken along line C-C of FIG. 9.

As shown in FIGS. 8 to 10, the holding unit 50 according to various embodiments is provided on the upper surface of a housing 10. The holding unit 50 includes a pressing member 51 which is inserted into a slot 11*a*, and a spring 52 which biases the pressing member 51 to be perpendicular to the longitudinal direction of the slot 11*a*. When a rotary lock 30 is erected, the pressing member 51 presses the upper end of a rod 31 which passes through the slot 11*a*, thus temporarily holding the rod 31.

In various embodiments of the present invention, the pressing member 51 may not move into the slot 11*a* so that the movement of the upper end of the rod 31 is not interrupted by the pressing member 51. One may appreciate a lot of methods, such as a protrusion or edges formed at the slot to prevent the pressing member 51 from moving into the slot 11*a*.

Figure 11A:
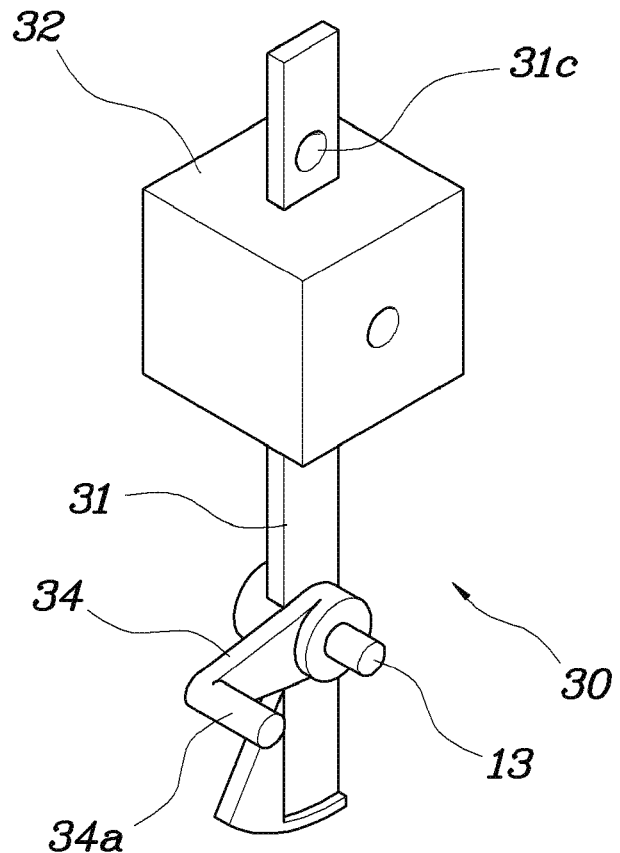
FIGS. 11A and 11B are views showing a rotary lock and the holding unit of the tray apparatus of FIG. 8, respectively.
Figure 11B:
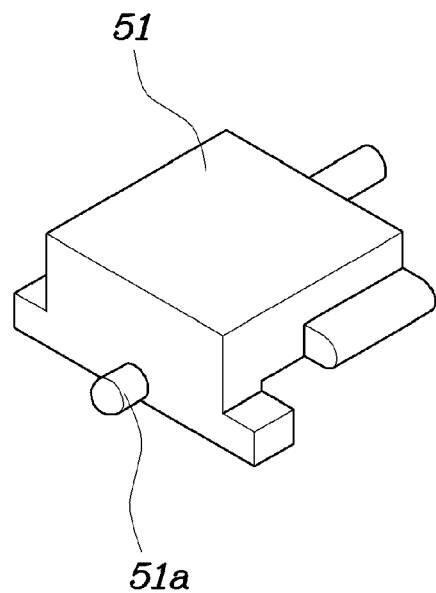
Figure 12:
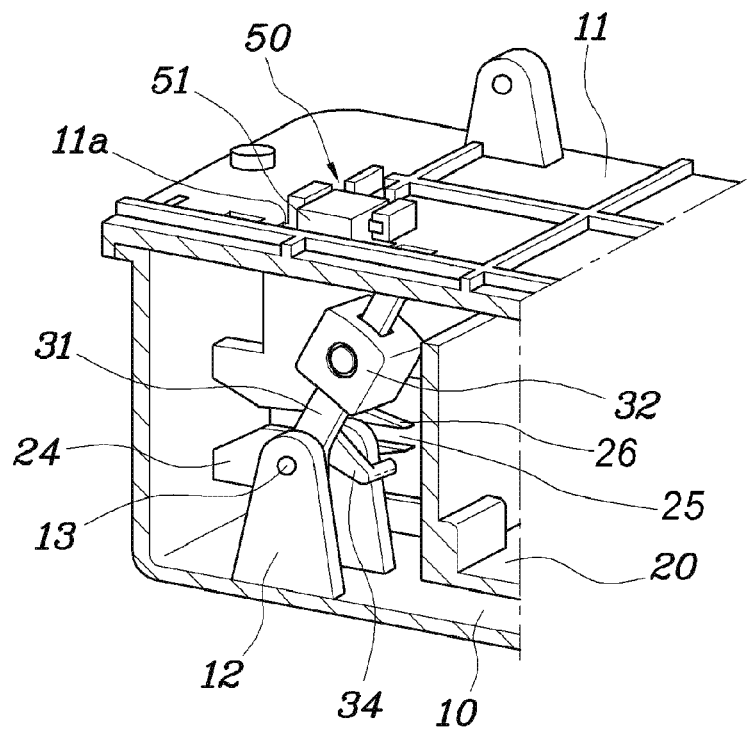
FIG. 12 is a view showing the state in which the rotary lock of the tray apparatus of FIG. 8 is rotated clockwise so as to lock the tray.
Figure 13:
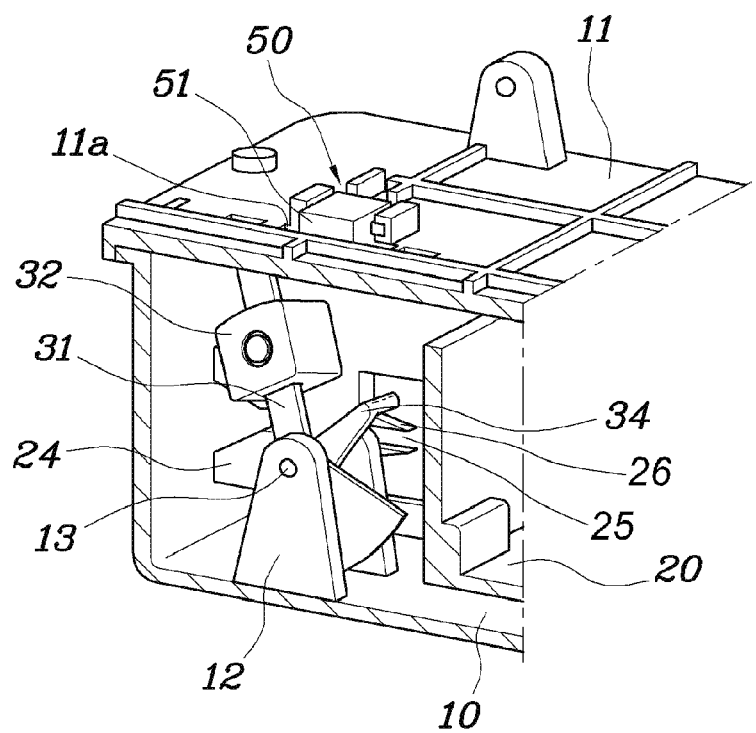
FIG. 13 is a view showing the state in which the rotary lock of the tray apparatus of FIG. 8 is rotated counterclockwise so as to lock the tray.

Referring to FIGS. 11A and 11B, in order to easily hold the upper end of the rod 31 using the pressing member 51, a locking hole 31*c* is formed in the upper end of the rod 31, and a locking protrusion 51*a* is formed in the front end of the pressing member 51 to correspond to the locking hole 31*c*. Both the locking hole 31*c* and the locking protrusion 51*a* have curved surfaces. When external force is applied to the tray apparatus, the rod 31 overcomes a locking force by the cooperation of the locking protrusion 51*a* with the locking hole 31*c*, and rotates around the hinge portion 13. Unlike some embodiments, according to various embodiments, elastic pieces 11*b* are provided on both ends of the slot 11*a*. When the rotary lock 30 is erected first, the upper end of the rod 31 is located at the center in the slot 11*a* (see FIG. 9). The structure of the slot 11*a* and the arrangement of the upper end of the rod 31 allow the rotary lock 30 to be rotated clockwise (see FIG. 12), or to be rotated counterclockwise (see FIG. 13) according to the direction in which shocks act on the tray apparatus. But, the result of repetitive experiments show that the rotary lock 30 is rotated clockwise, regardless of whether shocks are applied to the front or back of the tray apparatus.

Meanwhile, locking members 26 are provided on the tray wall 24 of the rotary lock mounting space in such a way as to be located above and under a sliding hole. The rotary lock 30 rotated by external shocks is held by the elastic pieces 11*b*. Unlike some embodiments, a torsion spring is not installed at the rotary lock 30. However, a member for providing restoring force to the rotary lock 30, such as the torsion spring, may be used in various embodiments.

As described above, the present invention provides a tray apparatus, which prevents a tray from unexpectedly opening due to external shocks and/or inertia force, and has superior opening prevention performance.

Further, a tray opening prevention mechanism is installed in the rear portion of the tray so that the mechanism is not exposed to the outside, and thus the front of the tray may have various designs.

For convenience in explanation and accurate definition in the appended claims, the terms "upper", "lower", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. Tray apparatus comprising:
   a housing;
   a tray slidably accommodated in the housing to be opened or closed;
   a rotary lock pivotally coupled to the housing at a hinge portion of the rotary lock and locking the tray to the housing when external shock is applied to the tray beyond a predetermined value, wherein the hinge portion is located between a lower end of the rotary lock and the center of gravity of the rotary lock;
   a holding, unit for holding the rotary lock in a normal state so that the rotary lock maintains an original position thereof; and first elastic piece formed at a slot installed at upper surface of the housing, upper end of the rotary lock passing through the slot that guides the upper end of the rotary lock in a forward or rearward direction, wherein first end of the slot is disposed substantially at the same position as the original position of the rotary lock and second end thereof is spaced from the first end of the slot in the forward direction from the original position of the rotary lock with a predetermined distance.

2. The tray apparatus as set forth in claim 1, wherein a weight is disposed at an upper portion of the rotary lock with a predetermined distance from the hinge portion.

3. The tray apparatus as set forth in claim 2, wherein the predetermined distance is adjustable along the rotary lock so as to control a response time of the rotary lock.

4. The tray apparatus as set forth in claim 1, wherein the rotary lock is pivotally coupled to the housing in a space between the housing and the tray so that the rotary lock returns to the original position as a user presses the try toward the housing.

5. The tray apparatus as set forth in claim 1, wherein the holding unit comprises an elastic member supplying elastic force to the rotary lock sufficiently enough to hold the rotary lock in the original position in the normal state.

6. The tray apparatus as set forth in claim 5, wherein the elastic member is a torsion spring disposed at the hinge portion of the rotary lock.

7. The tray apparatus as set forth in claim 1, wherein the first elastic piece protrudes from the upper surface of the housing toward the slot at the second end of the slot so that the upper end of the rotary lock is held between the upper surface and the first elastic piece when the upper end of the rotary lock rotates toward the first elastic piece after the external shock is applied beyond the predetermined value.

8. The tray apparatus as set forth in claim 1, further including:
  a pressing member disposed substantially at the original position of the rotary lock and slidably coupled to the upper surface of the housing in a perpendicular direction to longitudinal direction of the slot and slidably movable toward the slot; and
  an elastic member biasing the pressing member toward the slot, wherein the upper end of the rotary lock is held by the pressing member in the normal state.

9. The tray apparatus as set forth in claim 8, wherein a locking hole is formed in the upper end of the rotary lock, and a locking protrusion is provided on a front end of the pressing member to correspond to the locking hole.

10. The tray apparatus as set forth in claim 1, further comprising second elastic piece formed at the first end of the slot, wherein the first end of the slot extends in the rearward direction from the original position of the rotary lock with a predetermined distance and the second elastic piece protrudes from the upper surface toward the slot so that the upper end of the rotary lock is held between the upper surface and the second elastic piece when the upper end of the rotary lock rotates toward the second elastic piece after the external shock is applied beyond the predetermined value.

11. The tray apparatus as set forth in claim 1, further comprising a damping unit coupled to rotary lock to reduce rotation speed of the rotary lock when the external shock is applied to the rotary lock.

12. The tray apparatus as set forth in claim 11 wherein the damping unit includes:
  a gear portion provided on a lower end of the rotary lock, wherein the hinge portion of the rotary lock is spaced from bottom surface of the housing with a predetermined distance;
  a toothed wheel rotatably mounted to the bottom surface of the housing, and engaging with the gear portion, thus limiting rotation angle of the rotary lock; and
  a damper coupled to the toothed wheel, limiting the rotation speed of the rotary lock.

13. The tray apparatus as set forth in claim 1, further comprising:
  a hook attached to the rotary lock, the hook extending in the forward direction and bent perpendicularly at a front end thereof, wherein longitudinal axis of the hook is substantially perpendicular to longitudinal axis of the rotary lock; and
  a locking member provided at the tray, the locking member having a sliding hole, wherein the hook is locked to the locking member when the hook rotates along with the rotary lock with respect to the hinge portion of the rotary lock in tracing a predetermined radius and the hook is aligned to the sliding hole of the locking member when the hook is stationary.

14. The tray apparatus as set forth in claim 13, wherein a rotary lock mounting space is provided in a rear portion of the tray, and the locking member is provided on a tray wall in the rotary lock mounting space, and the sliding hole is formed in the tray wall so as to prevent the locking member from interfering with the hook when the rotary lock maintains the original state.

15. A passenger vehicle comprising the tray apparatus as set forth in claim 1.

* * * * *